E. GREENFIELD.
Improvement in Lozenge-Machine.
No. 129,277. Patented July 16, 1872.
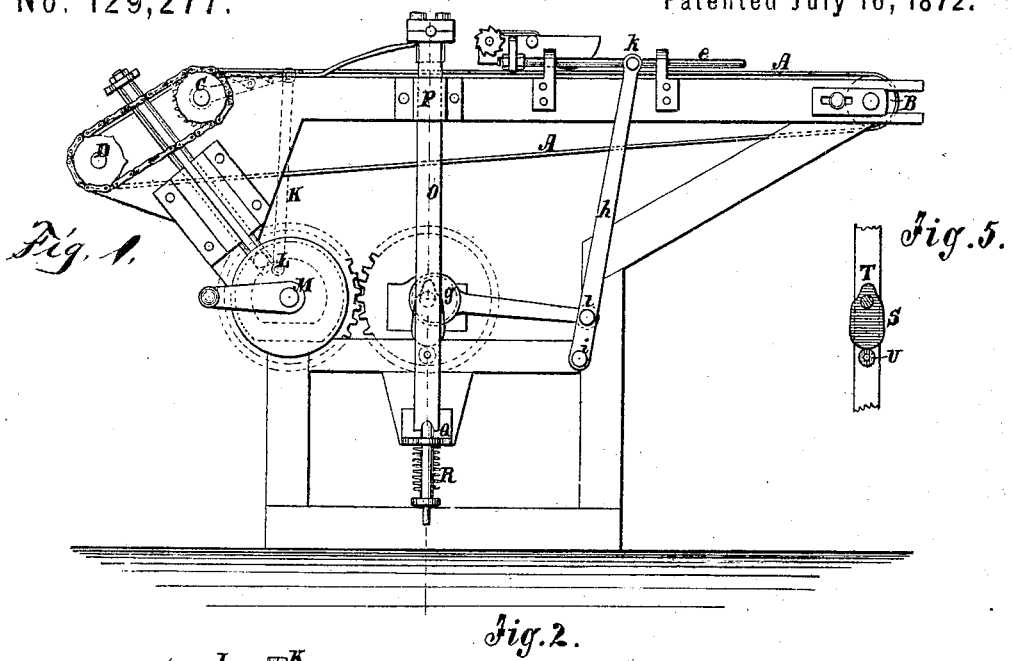
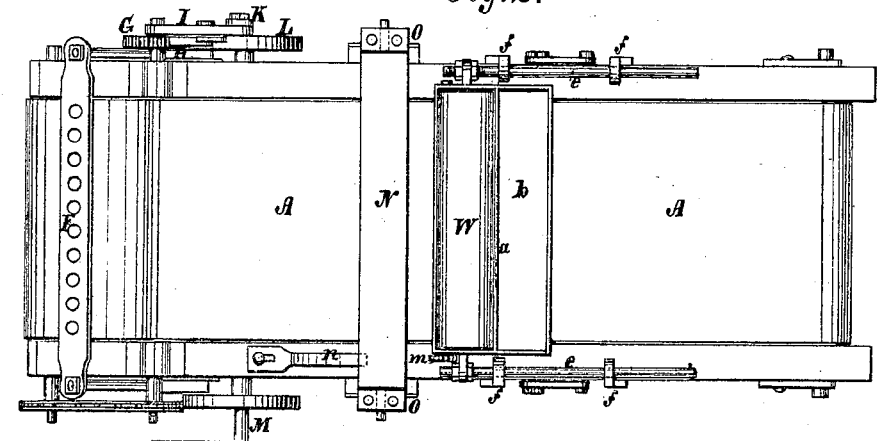
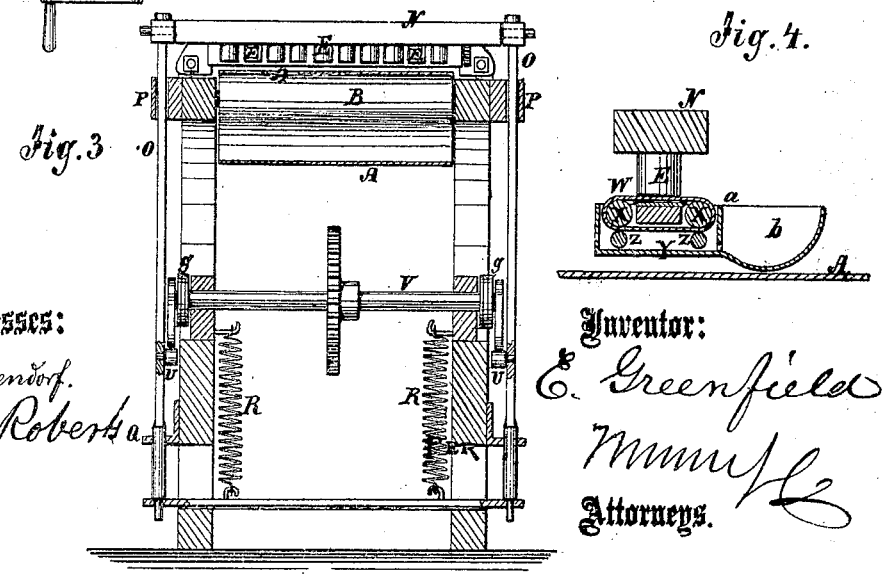
Witnesses:
A. Benneckendorf.
Alex F. Roberts
Inventor:
E. Greenfield
Attorneys.

UNITED STATES PATENT OFFICE.

JOSÉ GUARDIOLA, OF CHOCOLÁ, CENTRAL AMERICA.

IMPROVEMENT IN COFFEE-WASHING MACHINES.

Specification forming part of Letters Patent No. 129,278, dated July 16, 1872.

Specification describing a new and Improved Coffee-Washing Machine, invented by JOSÉ GUARDIOLA, of Chocolá, in Republic of Guatemala, Central America.

Figure 1 represents a vertical longitudinal section of my improved coffee-washing machine, the line $c$ $c$, Fig. 2, indicating the plane of section. Fig. 2 is a vertical transverse section of the same on the line $k$ $k$, Fig. 1.

Similar letters of reference indicate corresponding parts.

The object of this invention is to produce a machine wherein coffee can be liberated of the mucilage and other matter adhering to it previous to its being exposed to drying or otherwise prepared for use or transportation. The invention consists in the arrangement, within a cylindrical vessel, of a horizontal shaft carrying a series of projecting sticks or beaters by which the coffee will be struck and agitated until clean, and blades by which the washed coffee is finally ejected through a discharge-spout of the vessel.

A in the drawing represents a cylindrical vessel supported in a horizontal or slightly-inclined position by means of a frame, B. A hopper, C, is affixed above one end of the cylinder A, as shown in Fig. 1, while a spout, D, extends from the other end of the same cylinder, as shown in Fig. 2. E is a shaft, fitting centrally through the cylinder A, with its bearings either in the heads of said cylinder or in the frame B. A pulley, $a$, mounted upon the shaft E, or its equivalent, serves to receive and convey rotary motion to said shaft from suitable machinery. Radial beaters or sticks $b$ $b$ project from the shaft E into the cylinder, as shown. In line with the spout D the shaft carries a series of blades, $d$ $d$. The coffee to be washed is, together with some water or other liquid, poured through the hopper into the cylinder, and within the latter subjected to the action of the beaters, which remove from it all mucilage and other matter not required in connection with the bean. The coffee with the containing liquid is finally discharged through the spout D by means of the revolving blades $d$ $d$.

Having thus described my invention, I claim as new and desire to secure by Letters Patent—

The coffee-washing machine, composed of the cylinder A, hopper C, spout D, shaft E, beaters $b$ $b$, and blades $d$, all arranged substantially as herein shown and described.

J. GUARDIOLA.

Witnesses:
 LESLIE C. HANKS,
 HENRY SCHOLFIELD.